United States Patent
Wang et al.

(10) Patent No.: US 12,457,622 B2
(45) Date of Patent: *Oct. 28, 2025

(54) WIRELESS COMMUNICATION METHOD, eNODE B, AND USER EQUIPMENT

(71) Applicant: Panasonic Intellectual Property Corporation of America, Torrance, CA (US)

(72) Inventors: Lilei Wang, Beijing (CN); Hidetoshi Suzuki, Kanagawa (JP); Chi Gao, Beijing (CN); Masayuki Hoshino, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/680,894

(22) Filed: May 31, 2024

(65) Prior Publication Data

US 2024/0323971 A1    Sep. 26, 2024

Related U.S. Application Data

(63) Continuation of application No. 18/298,806, filed on Apr. 11, 2023, now Pat. No. 12,041,636, which is a
(Continued)

(51) Int. Cl.
*H04W 72/23* (2023.01)
*H04W 72/0446* (2023.01)
*H04W 72/0453* (2023.01)

(52) U.S. Cl.
CPC ........ *H04W 72/23* (2023.01); *H04W 72/0446* (2013.01); *H04W 72/0453* (2013.01)

(58) Field of Classification Search
CPC ....... H04W 72/23; H04W 5/00; H04W 76/38; H04W 52/02; H04W 72/29;
(Continued)

(56) References Cited

U.S. PATENT DOCUMENTS

| 10,080,242 B2 | 9/2018 | Liu et al. |
| 2014/0044056 A1 | 2/2014 | Chen et al. |

(Continued)

FOREIGN PATENT DOCUMENTS

| CN | 103929266 A | 7/2014 |
| JP | 2018514110 A | 5/2018 |

(Continued)

OTHER PUBLICATIONS

3GPP, "3rd Generation Partnership Project; Technical Specification Group Radio Access Network; Study on provision of low-cost MTC UEs based on LTE; (Release 12)," 3GPP TR 36.888 V2.0.3, May 2013, 56 pages.
(Continued)

*Primary Examiner* — Iqbal Zaidi
(74) *Attorney, Agent, or Firm* — Seed Intellectual Property Law Group LLP

(57) ABSTRACT

Provided are wireless communication methods, an eNB and a UE. The wireless communication method performed by an eNB includes transmitting downlink control information (DCI) to a user equipment (UE), wherein the DCI is designed based on a coverage enhancement level for the UE.

7 Claims, 2 Drawing Sheets

Related U.S. Application Data continuation of application No. 17/235,789, filed on Apr. 20, 2021, now Pat. No. 11,659,561, which is a continuation of application No. 16/667,357, filed on Oct. 29, 2019, now Pat. No. 11,012,991, which is a continuation of application No. 15/604,445, filed on May 24, 2017, now Pat. No. 10,499,383, which is a continuation of application No. PCT/CN2015/076262, filed on Apr. 10, 2015.

(58) Field of Classification Search
CPC ............. H04W 72/044; H04W 72/232; H04W 88/085; H04L 5/00; H04L 1/1812
See application file for complete search history.

(56) References Cited

U.S. PATENT DOCUMENTS

| | | | |
|---|---|---|---|
| 2014/0254531 A1* | 9/2014 | Lee | H04W 72/541 370/329 |
| 2015/0078224 A1 | 3/2015 | Xiong et al. | |
| 2016/0081065 A1 | 3/2016 | Shi et al. | |
| 2016/0286580 A1 | 9/2016 | Liu et al. | |
| 2016/0360551 A1 | 12/2016 | Bergman et al. | |
| 2017/0265174 A1 | 9/2017 | Wang et al. | |
| 2017/0295601 A1 | 10/2017 | Kim et al. | |

FOREIGN PATENT DOCUMENTS

| | | |
|---|---|---|
| WO | WO 2014183474 A1 | 11/2014 |
| WO | WO 2016028126 A1 | 2/2016 |

OTHER PUBLICATIONS

Alcatel-Lucent, Alcatel-Lucent Shanghai Bell, "Coverage enhancement for (E)PDCCH," R1-140154, Agenda Item: 7.2.2.2.3, 3GPP TSG-RAN WG1 Meeting #76, Prague, Czech Republic, Feb. 10-14, 2014, 6 pages.
Australian Examination Report dated Oct. 10, 2019 for the related Australian Patent Application No. 2015390318.
CATT, "Remaining details on PRACH coverage improvement for MTC UEs," R1-140075, Agenda Item: 7.2.2.2.2, 3GPP TSG RAN WG1 Meeting #76, Prague, Czech Republic, Feb. 10-14, 2014, 4 pages.
English translation of Chinese Office Action, dated Nov. 24, 2022 for the related Chinese Patent Application No. 202010789708.5, 12 pages.
Ericsson, "DCI format design for MTC," R1-150018, Agenda Item: 7.2.1.2.1, 3GPP TSG RAN WG1 Meeting #80, Athence, Greece, Feb. 9-13, 2015, 4 pages.
Extended European Search Report dated Nov. 19, 2019 for the related European Patent Application No. 19205608.3.
Extended European Search Report, mailed Mar. 5, 2018, for European Application 15888175.5-1215 / 3281466, 11 pages.
Huawei, HiSilicon, "DL physical control channels for MTC," R1-150060, Agenda Item: 7.2.1.2.1, 3GPP TSG RAN WG1 Meeting #80, Athens, Greece, Feb. 9-13, 2015, 4 pages.
Huawei, HiSilicon, "Frequency location scheduling for low cost MTC UEs," R1-141117, 3GPP TSG RAN WG1 Meeting #76bis, Shenzhen, China, Mar. 31-Apr. 4, 2014, 6 pages.
Indian Examination Report dated Mar. 27, 2021 for the corresponding Indian Patent Application No. 201747020589, 7 pages.
International Search Report, mailed Jan. 14, 2016, for International Application No. PCT/CN2015/076262, 2 pages.
MCC Support, "Draft Report of 3GPP TSG RAN WG1 #80 v0.2.0 (Athens, Greece, Feb. 9-13, 2015)," R1-15xxxx, 3GPP TSG RAN WG1 Meeting #80bis, Belgrade, Serbia, Apr. 20-24, 2015, 90 pages.
MCC, "Report of 3GPP TSG RAN WG3 meeting #85bis," TSGR3#86 R3-142631, Agenda Item: 3, TSG-RAN Working Group 3 meeting #86, San Francisco, USA, Nov. 17-21, 2014, 128 pages.
MediaTek Inc., "On the need of PDCCH for SIB and other Common Channels," R1-135422, Agenda Item: 6.2.2.2, 3GPP TSG-RAN WG1 #75, San Francisco, USA, Nov. 11-15, 2013, 6 pages.
New Postcom, "Correction to TBS determination for DCI format 1C," R1-102235, 3GPP TSG-RAN1 Meeting #60bis, Beijing, China, Apr. 12-16, 2010, 3 pages.
NSN, Nokia, "PDCCH Coverage Enhancement," R1-140550, Agenda Item: 7.2.2.2.3, 3GPP TSG-RAN WG1 Meeting #76, Prague, Czech Republic, Feb. 10-14, 2014, 3 pages.
Panasonic, "Consideration on frequency hopping for MTC UEs," R1-144799, Agenda Item: 6.3.1.2.1, 3GPP TSG RAN WG1 Meeting #79, San Francisco, USA, Nov. 17- 21, 2014, 3 pages.
Panasonic, "Coverage enhancement levels for MTC," R1-150313, Agenda Item: 7.2.1.2.2, 3GPP TSG RAN WG1 Meeting #80, Athens, Greece, Feb. 9-13, 2015, 3 pages.
Samsung, "Coverage Enhancements for Low Cost UEs," R1-144730, Agenda Item: 6.3.1.1.1, 3GPP TSG RAN WG1 #79, San Francisco, USA, Nov. 17-21, 2014, 4 pages.
Vodafone Group, "Update to TR 36.888 to include agreements from RAN1#72bis," R1-132587, 3GPP TSG RAN WG1 Meeting #73, Fukuoka, Japan, May 20-24, 2013, 1 page.
ZTE, "Coverage improvement techniques for low cost MTC UEs," R1-124829, Agenda Item: 6.3.3, 3GPP TSG RAN WG1 Meeting #71, New Orleans, USA, Nov. 12-16, 2012, 9 pages.
ZTE, "Further Considerations on Physical downlink control channel for MTC enhancement", R1-150142, Agenda Item: 7.2.1.2.1, 3GPP TSG RAN WG1 Meeting #80, Athens, Greece, Feb. 9-13, 2015, 6 pages.

* cited by examiner

100

Transmitting DCI to a UE, wherein the DCI is designed based on a coverage enhancement level for the UE  101

Receiving DCI transmitted from an eNB, wherein the DCI is designed based on a coverage enhancement level for the UE  201

Fig. 2

WIRELESS COMMUNICATION METHOD, eNODE B, AND USER EQUIPMENT

BACKGROUND

1. Technical Field

The present disclosure relates to the field of wireless communication, and in particular, to wireless communication methods, an eNode B (eNB), and a user equipment (UE).

2. Description of the Related Art

Machine-Type Communication (MTC) is a new type of communication in 3GPP in release 12 and an important revenue stream for operators. The coverage enhancement technique is quite useful for some MTC UEs like sensors in the basement which has large loss on signal strength due to penetration loss. For MTC with coverage enhancement, repetition is a basic solution to enhance the coverage.

SUMMARY

One non-limiting and exemplary embodiment provides an approach to design downlink control information (DCI) for a UE which may need coverage enhancement.

In one general aspect, the techniques disclosed here feature a wireless communication method performed by an eNode B (eNB), including: transmitting downlink control information (DCI) to a user equipment (UE), wherein the DCI is designed based on a coverage enhancement level for the UE.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1 schematically illustrates a flowchart of a wireless communication method for an eNB according to an embodiment of the present disclosure;

FIG. 2 schematically illustrates a flowchart of a wireless communication method for a UE according to an embodiment of the present disclosure;

DETAILED DESCRIPTION

Figure 3:
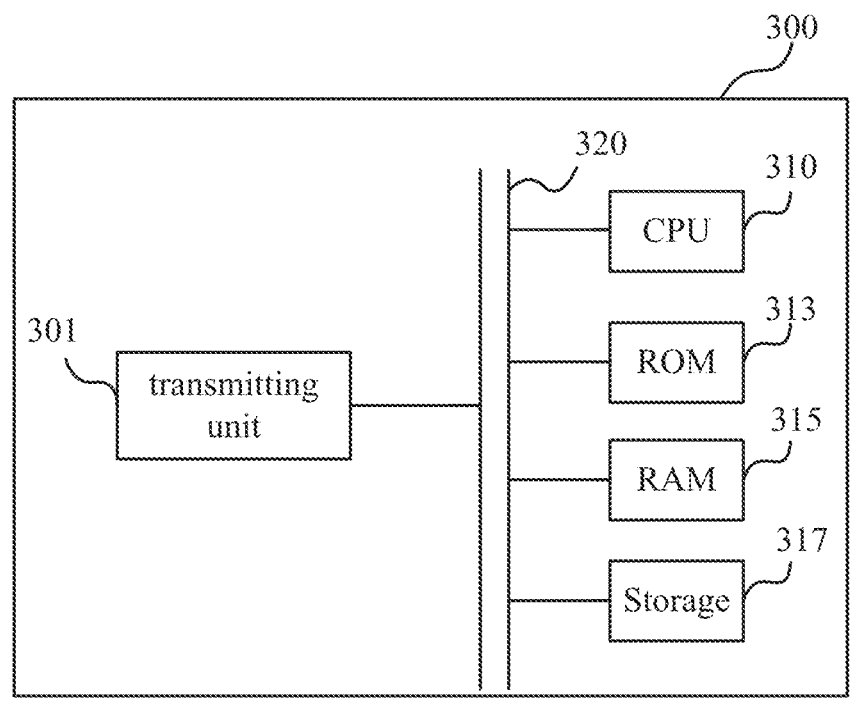
FIG. 3 schematically illustrates a block diagram of an eNB for wireless communication according to an embodiment of the present disclosure.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

In the present disclosure, MTC may be taken as an example to describe the principle of the present disclosure; however, it is noted that the wireless communication methods disclosed in the present disclosure can not only be applied to MTC, but also be applied to other wireless communications such as other communications conforming to LTE specifications as long as those wireless communications may require coverage enhancement (CE). Accordingly, the UEs are not limited to MTC UEs, but can be any other UEs that can perform the communication methods described in the present disclosure.

For wireless communication with coverage enhancement (for example, 15 dB for MTC), repetitions of a channel to be transmitted (e.g. Physical Downlink Shared Channel (PDSCH) or Physical Uplink Shared Channel (PUSCH)) can be a basic solution to enhance the coverage. The downlink control information (DCI) for a channel with coverage enhancement may need to indicate resource assignment in both time and frequency domains. How to design DCI with relatively small size to for example assign resources for such a channel with coverage enhancement becomes an important issue of the wireless communication with coverage enhancement.

For example, for a MTC UE, DCI size is quite important as it heavily impacts active time of the UE. Active time means the period that the UE's RF/baseband is keeping working status to transmit or receive physical signals. It reflects the UE's power consumption and is mainly related with repetitions in the time domain. Smaller DCI size can mean that the UE will use less time to receive the DCI. For example, assuming each repetition of a small DCI is transmitted by one ECCE (Enhanced Control Channel Element, 36 REs (Resource Element) per ECCE), QPSK (Quadrature Phase Shift Keying), 1/3 coding rate and full occupation of narrowband (6 PRBs) are used, and total repetition times are 96, then the UE only needs 4 subframes to receive such DCI.

However, assuming one PRB pair transmits each repetition of DCI with larger size, full occupation of narrowband is used, and total repetition times are 96, then the UE will need 16 subframes to receive such DCI. So it is meaningful to design DCI with smaller size. Such DCI could also be transmitted by less resource like one ECCE instead of one PRB pair.

Furthermore, one ECCE can only carry 24 bits, which also means it can only support 8-bit payload size assuming CRC (Cyclic Redundancy Check) uses 16 bits. So DCI payload size requirement is quite tight assuming less resource like one ECCE to transmit DCI. A 1-bit or 2-bit increase will require more ECCEs for DCI transmission.

In view of the above, how to design DCI with relatively small size for such a channel with coverage enhancement is an important issue for the wireless communication with coverage enhancement.

An embodiment of the present disclosure provides a wireless communication method 100 performed by an eNB, as shown in FIG. 1 which schematically illustrates a flowchart of the wireless communication method 100 according to an embodiment of the present disclosure. The wireless communication method 100 can include step 101 of transmitting DCI to a UE, wherein the DCI is designed based on a coverage enhancement level for the UE.

Situations of UEs with CE may be different due to environment, distance to the eNB, penetration loss, and so on. Therefore, the wireless communication design may need to consider different coverage enhancement levels like 5 dB, 10 dB, and 15 dB. Accordingly, the DCI can be designed based on the coverage enhancement level for the UE. It is noted that, if any field (for example, a resource assignment field) in the DCI is designed based on the coverage enhancement level, the DCI is considered to be designed based on the coverage enhancement level. For example, as described later in detail, a resource assignment field in DCI contains an index associated with the coverage enhancement level, and thus such DCI is considered to be designed based on the coverage enhancement level.

In an exemplary embodiment, the DCI can use different sizes for different sets of coverage enhancement levels. For example, the coverage enhancement levels can be divided into two sets by comparing the coverage enhancement levels with a predetermined level. If a coverage enhancement level is larger than the predetermined level, the coverage enhancement level is considered to be a large coverage enhancement level and is assigned to a large CE level set. If a coverage enhancement level is smaller than the predetermined level, the coverage enhancement level is considered to be a small coverage enhancement level and is assigned to a small CE level set. The coverage enhancement level of a UE can be configured by the RRC layer, and the predetermined level can be specified or configured by the RRC layer.

For example, for a small coverage enhancement level, a payload size of 26 bits for the DCI can be used; and for a large coverage enhancement level, a payload size of 11 bits for the DCI can be used.

Table 1 indicates that two different DCIs (DCI 1 and DCI 2) are designed for small coverage enhancement levels and large coverage enhancement levels respectively.

TABLE 1

| | DCI 1 (small coverage enhancement level) | DCI 2 (large enhancement level) Target is to reduce DCI size as much as possible |
|---|---|---|
| Contents | Resource indication (6 bits); MCS (5 bits); New data indicator (1 bit); Redundancy version (2 bits); HARQ process number (3 bits); TPC command for PUCCH (2 bits); Antenna port(s), scrambling identity and number of layers (3 bits); SRS request (1 bit); HARQ-ACK resource offset (2 bits) | Resource indication (6 bits); New data indicator (1 bit); MCS (2 bits); HARQ process number (1 bit); Antenna port(s), scrambling identity and number of layers (1 bit) |
| Payload size | 26 bits | 11 bits |

In the example of Table 1, DCI 2 for large CE level has much smaller size since many features like SRS request are not required.

Table 2 indicates that common DCI is designed for both small coverage enhancement levels and large coverage enhancement levels, but the field interpretation is different among different CE levels.

TABLE 2

| Common DCI (applied to all CE UEs) | |
|---|---|
| Contents | Resource indication (6 bits); MCS (5 bits for small coverage enhancement level; 2 bits for large coverage enhancement level); New data indicator (1 bit); Redundancy version (2 bits)-such field does not exist for large coverage enhancement; HARQ process number (3 bits for small coverage enhancement level and 1 bit for large coverage enhancement level); TPC command for PUCCH (2 bits for small coverage enhancement level and such field does not exist for large coverage enhancement); Antenna port(s), scrambling identity and number of layers (3 bits for small coverage enhancement level and 1 bit for large coverage enhancement); SRS request (1 bit for small coverage enhancement level and such field does not exist for large coverage enhancement); HARQ-ACK resource offset (2 bits for small coverage enhancement level and such field does not exist for large coverage enhancement) |
| Payload size | 26 bits or 11 bits depending on the coverage enhancement level |

As exemplarily shown in Table 1 and Table 2, when the DCI uses different sizes for different sets of coverage enhancement levels, the DCI for the large coverage enhancement levels can use much less bits. It is noted that the small coverage enhancement level herein also includes the case of no coverage enhancement.

In addition or alternatively, in an embodiment of the present disclosure, the coverage enhancement of a channel (e.g., PDSCH or PUSCH) scheduled by the DCI with the coverage enhancement level can be realized at least by repetitions in the time domain and/or repetitions in the frequency domain with a repetition number which represents the total number of repetitions of the channel, and a resource assignment field in the DCI uses a single index associated with the repetition number to jointly indicate resource assignment in both the time domain and the frequency domain. This embodiment is another exemplary way of designing the DCI based on the coverage enhancement level for the UE.

Repetition is an effective way to enhance the coverage of a channel. The repetition can happen in the time domain, for example, multiple subframes can be used to transmit a transport block repeatedly. The repetition can also happen in the frequency domain, for example, multiple PRBs in the frequency domain are used to transport a transport block. Aggregation in the frequency domain is a way of repetitions in the frequency domain. Obviously, the repetition can also happen in both the time domain and the frequency domain. The DCI scheduling a channel (e.g. PUSCH or PDCCH) requiring coverage enhancement may need to indicate resource assignment in both the time domain and the frequency domain. The resource assignment can be indicated in a resource assignment field. For example, the resource assignment field may need to indicate how many subframes and how many PRBs in the frequency domain are used for repetition. Optionally, the resource assignment field may also need to indicate the resource positions in the frequency domain. The total number of repetitions (the repetition number) can be the product of the subframe number in the time domain and the PRB number in the frequency domain in unit of PRB pair. For example, 100 repetitions (PRB pairs) can be reflected by 2 PRB×50 subframes, that is, the repetition number is 100. Alternatively, the repetition number can also be in unit of PRB. For example, 200 repetitions (PRBs) can be reflected by 2 PRB×100 slots (50 subframes). In the present disclosure, the unit of PRB pair is used to present the repetition number.

An example of resource assignment field design is separate indications for the time domain and the frequency domain. For example, one field is used to indicate the number of subframes in the time domain and another field is used to indicate the number and/or positions of PRBs in the frequency domain for example within the narrowband (6 PRBs). Table 3 illustrates one example of such separate indications.

TABLE 3

| | Repetitions in time domain | Number of PRBs in frequency domain | Total PRB pair number (repetition number) |
|---|---|---|---|
| | 1 | 1 | 1 |
| | 1 | 2 | 2 |
| | 1 | 3 | 3 |
| | 1 | 4 | 4 |
| | 1 | 5 | 5 |
| | 1 | 6 | 6 |
| | 2 | 1 | 2 |
| | 2 | 2 | 4 |
| | 2 | 3 | 6 |
| | 2 | 4 | 8 |
| | 2 | 5 | 10 |
| | 2 | 6 | 12 |
| | 4 | 1 | 4 |
| | 4 | 2 | 8 |
| | 4 | 3 | 12 |
| | 4 | 4 | 16 |
| | 4 | 5 | 20 |
| | 4 | 6 | 24 |
| Required field size | 2 bits | 3 bits | |

In the example of Table 3, 2 bits are used to indicate repetitions in the time domain and 3 bits are used to indicate repetitions in the frequency domain. Thus, totally 5 bits are needed for the resource assignment field. It is noted that, in this example, only PRB number in the frequency domain is indicated, but the resource position(s) in the frequency domain is not indicated. The resource position(s) can be for example configured by the RRC layer or based on identity (ID) of the UE.

Table 4 illustrates another example of separate indications, in which the resource position(s) in the frequency domain is indicated.

TABLE 4

| | Repetitions in time domain | Number of PRBs in frequency domain | Position in frequency domain | Total PRB pair number (repetition number) |
|---|---|---|---|---|
| | 1 | 1 | 6 candidates | 1 |
| | 1 | 2 | 5 candidates | 2 |
| | 1 | 3 | 4 candidates | 3 |
| | 1 | 4 | 3 candidates | 4 |
| | 1 | 5 | 2 candidates | 5 |
| | 1 | 6 | 1 candidates | 6 |
| | 2 | 1 | 6 candidates | 2 |
| | 2 | 2 | 5 candidates | 4 |
| | 2 | 3 | 4 candidates | 6 |
| | 2 | 4 | 3 candidates | 8 |
| | 2 | 5 | 2 candidates | 10 |
| | 2 | 6 | 1 candidates | 12 |
| | 4 | 1 | 6 candidates | 4 |
| | 4 | 2 | 5 candidates | 8 |
| | 4 | 3 | 4 candidates | 12 |

TABLE 4-continued

| | Repetitions in time domain | Number of PRBs in frequency domain | Position in frequency domain | Total PRB pair number (repetition number) |
|---|---|---|---|---|
| | 4 | 4 | 3 candidates | 16 |
| | 4 | 5 | 2 candidates | 20 |
| | 4 | 6 | 1 candidates | 24 |
| Required field size | 2 bits | | 5 bits | |

In the example of Table 4, 2 bits are used to indicate repetitions in the time domain and 5 bits are used to indicate repetitions in the frequency domain. Thus, totally 7 bits are needed for the resource assignment field.

The benefit of such a separate indication approach as exemplarily shown in Table 3 and Table 4 is flexibility on resource assignment. However, it has the problem that the field size for resource assignment is relatively large so that the DCI size may be large as well, and the UE's active time to for example receive PDSCH is not optimized.

In an embodiment of the present disclosure, a joint indication of resource assignment is proposed, that is, a resource assignment field in the DCI uses a single index associated with the repetition number to jointly indicate resource assignment in both the time domain and the frequency domain. It is noted that one repetition number can correspond to one or more indexes to represent one or more specific resource assignment ways for the one repetition number. Joint indication may reduce the field size for resource assignment. For example, in the example of Table 3, if two more repetition possibilities (for example, 6 and 8 repetitions) are added in the time domain, then there needs 3 bits to indicate 5 possibilities (1, 2, 4, 6 and 8). Therefore, totally 6 bits (3 bits for the time domain and 3 bits for the frequency domain) are needed if the separation indication approach is used. However, if a joint indication is used, then only 5 bits are needed to indicate 30 possibilities (5 in the time domain×6 in the frequency domain). One bit is saved. The 5 bits constitute an index associated with the repetition number. Optionally, in this embodiment, transport block size can also be determined by the index associated with the repetition number in the resource assignment field. For example, a smaller repetition number can indicate a smaller transport block size, and a larger repetition number can indicate a larger transport block size.

In a further embodiment, the same number of repetitions in the time domain is used for one and the same value of the repetition number. In other words, only one combination of repetition number in the time domain and repetition number (number of PRBs) in the frequency domain is used for one repetition number. For example, assuming the repetition number is 8, the resource assignment may be 2 PRBs in the time domain×4 subframes in the time domain (simplified as 2 PRBs×4 subframes) or 4 PRBs×2 subframe. However, according to this embodiment, for the repetition number of 8, only one possibility of repetition number in the time domain can be used and the UE knows it in advance. For example, the repetition number in the time domain can be either 4 subframes or 2 subframes, and accordingly the repetition number in the frequency domain can be either 2 PRBs or 4 PRBs. The selection of repetition number in the time domain or the frequency domain for each repetition number can be for example configured by the RRC layer or specified in the standard. Therefore, when the UE receives an index corresponding to the repetition number, it can determine the repetition number in the time domain and the repetition number in the frequency domain. In this way, the size of the resource assignment filed can be reduced since only one combination of repetition number in the time domain and repetition number in the frequency domain needs to be indicated for one repetition number. Table 5 illustrates a specific example of the embodiment that each repetition number only has one combination of repetition number in the time domain and repetition number in the frequency domain in the context of Table 3.

TABLE 5

| Repetitions in time domain | Number of PRBs in frequency domain | Total PRB pair number (repetition number) | Index in DCI |
|---|---|---|---|
| 1 | 1 | 1 | 0 |
| 1 | 2 | 2 | 1 |
| 1 | 3 | 3 | 2 |
| 1 | 4 | 4 | 3 |
| 1 | 5 | 5 | 4 |
| 1 | 6 | 6 | 5 |
| 2 | 4 | 8 | 6 |
| 2 | 5 | 10 | 7 |
| 2 | 6 | 12 | 8 |
| 4 | 4 | 16 | 9 |
| 4 | 5 | 20 | 10 |
| 4 | 6 | 24 | 11 |
| Required field size | | | 3 bits |

In Table 5, each repetition number only has one combination of repetition number in the time domain and repetition number in the frequency domain; therefore, only 3 bits are needed for the resource assignment field, which saves 2 bits compared with the approach show in Table 3.

Table 6 illustrates another specific example of the embodiment that each repetition number only has one combination of repetition number in the time domain and repetition number in the frequency domain in the context of Table 4.

TABLE 6

| Repetitions in time domain | Number of PRBs in frequency domain | Position in frequency domain | Total PRB pair number (repetition number) | Index in DCI |
|---|---|---|---|---|
| 1 | 1 | 6 candidates | 1 | 0-5 |
| 1 | 2 | 5 candidates | 2 | 6-10 |
| 1 | 3 | 4 candidates | 3 | 11-14 |
| 1 | 4 | 3 candidates | 4 | 15-17 |
| 1 | 5 | 2 candidates | 5 | 18-19 |
| 1 | 6 | 1 candidates | 6 | 20 |
| 2 | 4 | 3 candidates | 8 | 21-23 |
| 2 | 5 | 2 candidates | 10 | 24-25 |
| 2 | 6 | 1 candidates | 12 | 26 |
| 4 | 4 | 3 candidates | 16 | 27-29 |
| 4 | 5 | 2 candidates | 20 | 30-31 |
| 4 | 6 | 1 candidates | 24 | 32 |
| Required field size | | | | 5 bits |

In Table 6, each repetition number only has one combination of repetition number in the time domain and repetition number in the frequency domain; therefore, only 5 bits are needed for the resource assignment field, which saves 2 bits compared with the approach show in Table 4.

It is reasonable that each repetition number has only one combination of repetition number in the time domain and repetition number in the frequency domain based on the reason that there is almost no performance difference between different combinations of repetition number in the time domain and repetition number in the frequency domain. For example, there is almost no performance difference between 2 PRBs×4 subframes and 4 PRB×2 subframe for resource assignment. First, frequency hopping is disabled within "multiple subframes" to realize symbol-level combining based on current 3GPP agreements (refer to "Draft Report of 3GPP TSG RAN WG1 #80 v0.2.0"). In other words, the resources should keep the same position in the frequency domain within "multiple subframes". For example, the value of "multiple subframes" can be 4. Second, the total repetition times are the same, for example, 2 PRBs×4 subframes can realize 8 repetitions and 4 PRB×2 subframe can also realize 8 repetitions. Therefore, the embodiment that each repetition number has only one combination of repetition number in the time domain and repetition number in the frequency domain can reduce the field size of resource assignment while remaining the performance almost unchanged.

In a further embodiment, the least possible repetitions in the time domain can be assigned for one and the same value of the repetition number. In other words, repetitions in the time domain should be used as less as possible to reduce the UE's active time and thus reduce the UE's power consumption. The UE's active time is related to repetition number in the time domain. The smaller the repetition number in the time domain is, the less the UE's active time is. For example, for the total repetition number of 8, the resource assignment of "4 PRBs×2 subframes" should be used assuming narrowband of total 6 PRBs in the frequency domain according to the embodiment since repetitions of 2 subframes in the time domain are the least possible repetitions and the UE's active time is the least in this case. For example, "2 PRBs×4 subframes" has more repetitions in the time domain but less repetitions in the frequency domain, and "4 PRBs×2 subframes" has more repetitions in the frequency domain but less repetitions in the time domain. Therefore, the UE's active time caused by receptions is larger in the case of "2 PRBs×4 subframes" than in the case of "4 PRBs×2 subframes". The UE keeps active for 4 subframes in the case of "2 PRBs×4 subframes" but only needs to keep active for 2 subframes in the case of "4 PRBs×2 subframes". As specific examples, the embodiment can be applied to Table 5 and Table 6.

In a further embodiment, only a proper subset of all possible resource positions in the frequency domain are considered as frequency position candidates of the resource assignment for at least one value of the repetition number. In other words, only limited resource candidates (not all possible resource positions) are kept in the frequency domain since there is no much scheduling gain within narrowband. In this way, the size of the resource assignment field can be further reduced. Table 7 is an example of limited resource candidates in the frequency domain in the context of Table 6.

TABLE 7

| Repetitions in time domain | Number of PRBs in time domain | Position in frequency domain | Total PRB pair number (repetition number) | Index in DCI |
|---|---|---|---|---|
| 1 | 1 | X1, Y1, Z1 | 1 | 0-2 |
| 1 | 2 | X2, Y2, Z2 | 2 | 3-5 |
| 1 | 3 | X3, Y3 | 3 | 6-7 |
| 1 | 4 | X4 | 4 | 8 |
| 1 | 5 | X5 | 5 | 8 |

TABLE 7-continued

| Repetitions in time domain | Number of PRBs in time domain | Position in frequency domain | Total PRB pair number (repetition number) | Index in DCI |
|---|---|---|---|---|
| 1 | 6 | X6 | 6 | 10 |
| 2 | 4 | X7 | 8 | 11 |
| 2 | 5 | X8 | 10 | 12 |
| 2 | 6 | X9 | 12 | 13 |
| 4 | 4 | X10 | 16 | 14 |
| 4 | 5 | X11 | 20 | 15 |
| 4 | 6 | X12 | 24 | 16 |
| Required field size | | | | 4 bits |

In Table 7, for the repetition number 1, only 3 candidates (X1, Y1 and Z1) out of 6 candidates (assuming narrowband) are considered; for the repetition number 2, only 3 candidates (X2, Y2 and Z2) out of 5 candidates are considered; and so on. In this example, only 4 bits are needed and thus 1 bit is further saved compared with Table 6. The set of resource candidates (i.e., proper subset of all possible resource positions) can be configured by the RRC layer or determined based on ID of the UE.

The above embodiments can be used to any uplink channel (e.g. PUSCH) or downlink channel (e.g. PDSCH) for any enhancement level or repetition number. In an example, the above embodiments are used to a downlink channel for a small enhancement level or repetition number. Whether the coverage enhancement level is large or small can be determined by comparing it with a predetermined level. The predetermined level can be configured by the RRC layer or specified. In some embodiments, the coverage enhancement level can also be configured by the RRC layer. It is noted that the above coverage enhancement level also includes the case of no enhancement, and the repetition number also includes the case of no repetition. For example, the first lines in Tables 3-7 represent no repetition.

In a further embodiment, if the coverage enhancement level is larger than a predetermined level and the channel scheduled by the DCI is a downlink channel, all possible resources in the frequency domain are assigned in the resource assignment. In other words, if the coverage enhancement level is large, full occupation of the resources (for example 6 PRBs of narrowband) in the frequency domain can be used in a downlink channel in order to reduce the UE's active time. Table 8 illustrates an example of full occupation of frequency resources.

TABLE 8

| Repetitions in time domain | Number of PRBs in frequency domain | Index in DCI |
|---|---|---|
| 8 | 6 | 0 |
| 20 | 6 | 1 |
| 40 | 6 | 2 |
| 100 | 6 | 3 |
| 200 | 6 | 4 |
| 400 | 6 | 5 |
| 800 | 6 | 6 |
| 1000 | 6 | 7 |
| Required field size | | 3 bits |
| Resource assignment size in separation indications (time + frequency) | | 6 bits Time domain: 4 bits Frequency domain: 2 bits |

In Table 8, all 6 PRBs of narrowband are occupied in the time domain, and only 3 bits are needed to indicate resource assignment, which saves 3 bits compared with the separate indication approach. In addition, according to this embodiment, the UE's active time can be reduced.

In a further embodiment, if the coverage enhancement level is larger than a predetermined level and the channel scheduled by the DCI is an uplink channel, only one resource in the frequency domain is assigned in the resource assignment. One PRB transmission in the frequency domain can realize the largest power spectral density (PSD) in uplink. Optionally, the one resource in the frequency domain can be configured by the RRC layer or based on ID of the UE. Alternatively, limited resource candidates in the frequency domain can be configured for the resource assignment of the one resource. Table 9 illustrates an example of one PRB transmission combined with limited resource candidates in the frequency domain.

TABLE 9

| Repetitions in time domain | Number of PRBs in frequency domain | Position in frequency domain | Index in DCI |
|---|---|---|---|
| 8 | 1 | X, Y, Z | 0-2 |
| 20 | 1 | X, Y, Z | 3-5 |
| 40 | 1 | X, Y, Z | 6-8 |
| 100 | 1 | X, Y, Z | 9-11 |
| 200 | 1 | X, Y, Z | 12-14 |
| 400 | 1 | X, Y, Z | 15-17 |
| 800 | 1 | X, Y, Z | 18-20 |
| 1000 | 1 | X, Y, Z | 21-23 |
| Required field size | | | 5 bits |
| Resource assignment size in separate indications (time + frequency) | | | 6 bits Time domain: 4 bits Frequency domain: 2 bits |

In Table 9, one PRB transmission and three resource candidates in the frequency domain are used in the uplink for each large repetition number. In other words, only repetitions in the time domain have multiple options, for example 8, 20, 40, 100 and so on. The field size for resource assignment is reduced from 6 bits to 5 bits. It is noted that the set of resource candidates {x, y, z} can be configured by the RRC layer or determined based on ID of the UE.

In an embodiment, the resource assignment field can be interpreted based on whether the coverage enhancement level is large or small. In other words, different sets of coverage enhancement levels can use different designs of the resource assignment field. For example, for a small coverage level, the interpretation of the resource assignment field can use any of Tables 5-7; for a large coverage level, the interpretation of the resource assignment field can use Table 8 for downlink and Table 9 for uplink. In this example, it assumes that the UE knows the coverage enhancement level in advance in order to determine which table should be used. For example, the UE can know the information by RRC configuration.

In another embodiment, all possible repetition numbers should be covered in one table in case the UE does not know the coverage enhancement level for example during system information block (SIB) acquisition or random access period as it is common information that should be used for all UEs. For example, Table 10 illustrates an exemplary table that contains all possible repetition numbers (from 1 repetition in the time domain to 1000 repetitions in the time domain). Therefore, the UE can interpret the resource assignment field even if it does not know the coverage enhancement level.

TABLE 10

| Repetitions in time domain | Number of PRBs in frequency domain | Position in frequency domain | Index in DCI |
| --- | --- | --- | --- |
| 1 | 1 | X1, Y1, Z1 | 0-2 |
| 1 | 2 | X2, Y2, Z2 | 3-5 |
| 1 | 4 | Only one candidate in the following | 6 |
| 1 | 6 | | 7 |
| 2 | 4 | | 8 |
| 2 | 6 | | 9 |
| 4 | 4 | | 10 |
| 4 | 6 | | 11 |
| 8 | 6 | | 12 |
| 20 | 6 | | 13 |
| 40 | 6 | | 14 |
| 100 | 6 | | 15 |
| 200 | 6 | | 16 |
| 400 | 6 | | 17 |
| 800 | 6 | | 18 |
| 1000 | 6 | | 19 |
| Required field size | | | 5 bits |
| Resource assignment size in separate indications (time + frequency) | | | 6 bits Time domain: 4 bits Frequency domain: 2 bits |

As shown in Table 10, the field size for resource assignment is reduced from 6 bits to 5 bits compared with the separate indication approach. It is noted that Table 10 is only an example of the solution covering all possible repetition numbers. The technical features described in the other embodiments can also be applied to the solution covering all possible repetition numbers unless the context indicates otherwise.

According to embodiments of the present disclosure, the DCI size can be reduced. In some embodiments, the active time of the UE can be reduced and/or the PSD can be increased. It is noted that the above embodiments can be combined unless the context indicates otherwise. For example, the embodiments of different DCI size for different sets of coverage enhancement levels can be combined with any of the other embodiments.

In addition, at the UE side, an embodiment of the present disclosure provides a wireless communication method 200 performed by a UE, as shown in FIG. 2 which schematically illustrates a flowchart of the wireless communication method 200 according to an embodiment of the present disclosure. The wireless communication method includes step 201 of receiving downlink control information (DCI) transmitted from an eNB, wherein the DCI is designed based on a coverage enhancement level for the UE. It is noted that the above descriptions for the wireless communication can also be applied to the wireless communication method 100, which will not be repeated here.

Further, embodiments of the present disclosure also provide an eNB and a UE to perform the above described communication methods. FIG. 3 schematically illustrates a block diagram of an eNB 300 for wireless communication according to an embodiment of the present disclosure. The eNB 300 can include a transmitting unit 301 configured to transmit downlink control information (DCI) to a UE, wherein the DCI is designed based on a coverage enhancement level for the UE.

The eNB 300 according to the present disclosure may optionally include a CPU (Central Processing Unit) 310 for executing related programs to process various data and control operations of respective units in the eNB 300, a ROM (Read Only Memory) 313 for storing various programs required for performing various process and control by the CPU 310, a RAM (Random Access Memory) 315 for storing intermediate data temporarily produced in the procedure of process and control by the CPU 310, and/or a storage unit 317 for storing various programs, data and so on. The above transmitting unit 301, CPU 310, ROM 313, RAM 315 and/or storage unit 317 etc. may be interconnected via data and/or command bus 320 and transfer signals between one another.

Respective units as described above do not limit the scope of the present disclosure. According to one implementation of the disclosure, the functions of the above transmitting unit 301 may be implemented by hardware, and the above CPU 310, ROM 313, RAM 315 and/or storage unit 317 may not be necessary. Alternatively, the functions of the above transmitting unit 301 may also be implemented by functional software in combination with the above CPU 310, ROM 313, RAM 315 and/or storage unit 317 etc.

Figure 4:
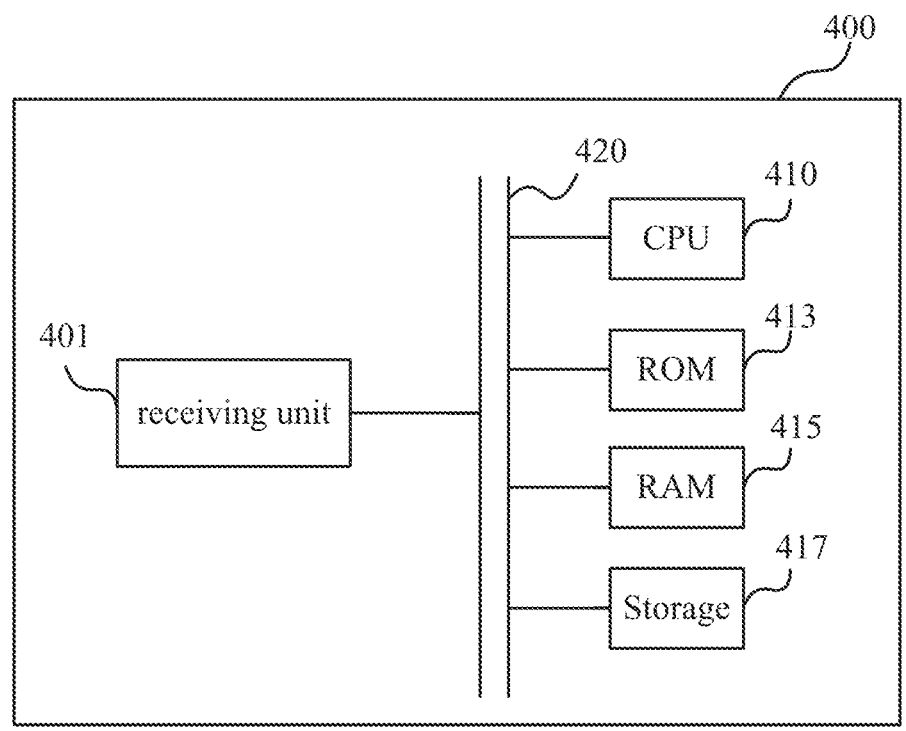
FIG. 4 schematically illustrates a block diagram of a UE for wireless communication according to an embodiment of the present disclosure.

FIG. 4 schematically illustrates a block diagram of a UE 400 for wireless communication according to an embodiment of the present disclosure. The UE 400 can include a receiving unit configured to receive downlink control information (DCI) transmitted from an eNB, wherein the DCI is designed based on a coverage enhancement level for the UE.

The UE 400 according to the present disclosure may optionally include a CPU (Central Processing Unit) 410 for executing related programs to process various data and control operations of respective units in the UE 400, a ROM (Read Only Memory) 413 for storing various programs required for performing various process and control by the CPU 410, a RAM (Random Access Memory) 415 for storing intermediate data temporarily produced in the procedure of process and control by the CPU 410, and/or a storage unit 417 for storing various programs, data and so on. The above receiving unit 401, CPU 410, ROM 413, RAM 415 and/or storage unit 417 etc. may be interconnected via data and/or command bus 420 and transfer signals between one another.

Respective units as described above do not limit the scope of the present disclosure. According to one implementation of the disclosure, the functions of the above receiving unit 401 may be implemented by hardware, and the above CPU 410, ROM 413, RAM 415 and/or storage unit 417 may not be necessary. Alternatively, the functions of the above receiving unit 401 may also be implemented by functional software in combination with the above CPU 410, ROM 413, RAM 415 and/or storage unit 417 etc.

It is noted that the above descriptions for the communication methods can also be applied to the UE or eNB, which will not be repeated herein.

The present disclosure can be realized by software, hardware, or software in cooperation with hardware. Each functional block used in the description of each embodiment described above can be realized by an LSI as an integrated circuit, and each process described in each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

It is noted that the present disclosure intends to be variously changed or modified by those skilled in the art based on the description presented in the specification and known technologies without departing from the content and the scope of the present disclosure, and such changes and applications fall within the scope that claimed to be protected. Furthermore, in a range not departing from the content of the disclosure, the constituent elements of the above-described embodiments may be arbitrarily combined.

Embodiments of the present disclosure can at least provide the following subject matters.

According to an embodiment of the present disclosure, there is provided a wireless communication method performed by an eNode B (eNB), including:
  transmitting downlink control information (DCI) to a user equipment (UE), wherein
  the DCI is designed based on a coverage enhancement level for the UE.

In the foregoing wireless communication method,
  coverage enhancement of a channel scheduled by the DCI with the coverage enhancement level is realized at least by repetitions in a time domain and/or repetitions in a frequency domain with a repetition number which represents a total number of repetitions of the channel, and
  a resource assignment field in the DCI uses a single index associated with the repetition number to jointly indicate resource assignment in both the time domain and the frequency domain.

In the foregoing wireless communication method,
  the same number of repetitions in the time domain is used for one and the same value of the repetition number.

In the foregoing wireless communication method,
  the least possible repetitions in the time domain are assigned for one and the same value of the repetition number.

In the foregoing wireless communication method,
  only a proper subset of all possible resource positions in the frequency domain is considered as frequency position candidates of the resource assignment for at least one value of the repetition number.

In the foregoing wireless communication method,
  if the coverage enhancement level is larger than a predetermined level and the channel scheduled by the DCI is a downlink channel, all possible resources in the frequency domain are assigned in the resource assignment.

In the foregoing wireless communication method,
  if the coverage enhancement level is larger than a predetermined level and the channel scheduled by the DCI is an uplink channel, only one resource in the frequency domain is assigned in the resource assignment.

In the foregoing wireless communication method,
  if the coverage enhancement level is smaller than the predetermined level, the least possible repetitions in the time domain are assigned for one and the same value of the repetition number.

In the foregoing wireless communication method,
  a transport block size is determined by the index associated with the repetition number in the resource assignment field.

In the foregoing wireless communication method,
  the DCI uses different sizes for different sets of coverage enhancement levels.

According to another embodiment of the present disclosure, there is provided a wireless communication method performed by a user equipment (UE), including:
  receiving downlink control information (DCI) transmitted from an eNode B (eNB), wherein
  the DCI is designed based on a coverage enhancement level for the UE.

In the foregoing wireless communication method,
  coverage enhancement of a channel scheduled by the DCI with the coverage enhancement level is realized at least by repetitions in a time domain and/or repetitions in a frequency domain with a repetition number which represents a total number of repetitions of the channel, and
  a resource assignment field in the DCI uses a single index associated with the repetition number to jointly indicate resource assignment in both the time domain and the frequency domain.

According to another embodiment of the present disclosure, there is provided an eNode B (eNB) for wireless communication, including:
  a transmitter that transmits downlink control information (DCI) to a user equipment (UE), wherein
  the DCI is designed based on a coverage enhancement level for the UE.

In the foregoing eNB,
  coverage enhancement of a channel scheduled by the DCI with the coverage enhancement level is realized at least by repetitions in a time domain and/or repetitions in a frequency domain with a repetition number which represents a total number of repetitions of the channel, and
  a resource assignment field in the DCI uses a single index associated with the repetition number to jointly indicate resource assignment in both the time domain and the frequency domain.

According to another embodiment of the present disclosure, there is provided a user equipment (UE) for wireless communication, including:
  a receiver that receives downlink control information (DCI) transmitted from an eNode B (eNB), wherein
  the DCI is designed based on a coverage enhancement level for the UE.

In addition, embodiments of the present disclosure can also provide an integrated circuit which includes module(s) for performing the step(s) in the above respective communication methods. Further, embodiments of the present disclosure can also provide a computer readable storage medium having stored thereon a computer program containing a program code which, when executed on a computing device, performs the step(s) of the above respective communication methods.

The invention claimed is:
1. An integrated circuit, comprising:
  generation circuitry which, in operation, controls of a generation of first downlink control information (DCI) used for a first coverage enhancement (CE) level, the first DCI including frequency domain information and time domain information, the frequency domain information indicating a number of physical resource blocks (PRBs) from a plurality of candidates for the number of PRBs in a frequency domain within a narrowband which is a part of a bandwidth, and the time domain information indicating a number of repetitions in a time domain; and a transmission circuitry which, in operation, controls a transmission of a physical downlink shared channel (PDSCH) using the number of PRBs and the number of repetitions in the time domain, wherein a number of bits of the first DCI is smaller than that of second DCI used for a second CE level, the second CE level being lower than the first CE level.

2. The integrated circuit according to claim 1, wherein one of the first CE level and the second CE level is configured by Radio Resource Control (RRC) layer.

3. The integrated circuit according to claim 1, wherein the first CE level is used when a CE level is larger than a threshold.

4. The integrated circuit according to claim 1, wherein one or more contents included in the first DCI are same as one or more contents included in the second DCI, the one or more contents included in the first DCI having fewer bits than the one or more contents included in the second DCI.

5. The integrated circuit according to claim 1, wherein the second DCI includes all contents of the first DCI and additional contents.

6. The integrated circuit according to claim 1, wherein the frequency domain information further indicates a position of the PRBs in the frequency domain within the narrowband.

7. The integrated circuit according to claim 1, wherein the narrowband is composed of 6 PRBs.

* * * * *